United States Patent
Sumner et al.

(10) Patent No.: US 11,087,517 B2
(45) Date of Patent: Aug. 10, 2021

(54) SKETCH-BASED ABSTRACTION FOR CHARACTER POSING AND SYNTHESIS

(71) Applicants: Disney Enterprises, Inc., Burbank, CA (US); ETH Zürich (Eidgenössische Technische Hochschule Zürich), Zürich (CH)

(72) Inventors: Robert Walker Sumner, Zurich (CH); Maurizio Nitti, Zurich (CH); Stelian Coros, Zurich (CH); Bernhard Thomaszewski, Zurich (CH); Fabian Andreas Hahn, St. Albans (GB); Markus Gross, Zurich (CH); Frederik Rudolf Mutzel, Dietikon (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 0 days.

(21) Appl. No.: 15/172,078

(22) Filed: Jun. 2, 2016

(65) Prior Publication Data

US 2016/0358365 A1    Dec. 8, 2016

Related U.S. Application Data

(60) Provisional application No. 62/170,458, filed on Jun. 3, 2015.

(51) Int. Cl.
*G06T 13/80* (2011.01)
*G06T 13/40* (2011.01)
(Continued)

(52) U.S. Cl.
CPC ............ *G06T 13/40* (2013.01); *G06T 11/203* (2013.01); *G06T 11/60* (2013.01); *G06T 13/80* (2013.01);
(Continued)

(58) Field of Classification Search
None
See application file for complete search history.

(56) References Cited

U.S. PATENT DOCUMENTS

| 5,680,531 A | * | 10/1997 | Litwinowicz | ........... G06T 13/80 |
| | | | | 345/473 |
| 2016/0093084 A1 | * | 3/2016 | Sumner | ................... G06T 13/40 |
| | | | | 345/473 |

(Continued)

OTHER PUBLICATIONS

Terzopoulos, "The Computation of Visible-Surface Representations" IEEE Transactions on Pattern Analysis and Machine Intelligence, vol. 10, No. 4, Jul. 1988, p. 417-438.*

(Continued)

*Primary Examiner* — Yanna Wu
(74) *Attorney, Agent, or Firm* — Baker Botts L.L.P.

(57) ABSTRACT

In particular embodiments, a 2D representation of an object may be provided. A first method may comprise: receiving sketch input identifying a target position for a specified portion of the object; computing a deformation for the object within the context of a character rig specification for the object; and displaying an updated version of the object. A second method may comprise detecting sketch input; classifying the sketch input, based on the 2D representation, as an instantiation of the object; instantiating the object using a 3D model of the object; and displaying a 3D visual representation of the object.

20 Claims, 16 Drawing Sheets

(51) Int. Cl.
    *G06T 19/20* (2011.01)
    *G06T 11/60* (2006.01)
    *G06T 11/20* (2006.01)
(52) U.S. Cl.
    CPC ...... *G06T 19/20* (2013.01); *G06T 2219/2021* (2013.01)

(56) References Cited

U.S. PATENT DOCUMENTS

2016/0110595 A1* 4/2016 Wang ............... G06K 9/00375 705/27.2
2017/0186165 A1* 6/2017 Taylor .................. G06T 17/205

OTHER PUBLICATIONS

Baskin, et al., Mike and Tina character rig 2.8.0 [Online; accessed Jan. 8, 2019] http://www.creativecrash.com/maya/downloads/character-rigs/c/mike-and-tina-character-rig, 3 pages.
Choi, et al., Retrieval and Visulization of Human Motion Data via Stick Figures, 2012 Comput. Graph. Forum 31,7-1, pp. 2057-2065.
Cingold, et al., Structured annotation for 2d-to-3d modeling, ACM Trans. Graph. vol. 28 Issue 5, (Dec. 2009) 148:1-148:9.
Cocos, et al., Computational design of mechanical characters, ACM Trans. on Graphics 32,4 (Jul. 2013), 83:1-83:12.
Davis, et al., A sketching interface fa articulated figure animation. In Proceedings of the 2003 ACM Sig-Graph/Eurographics Symposium on Computer Animation, Eurographics Association, Aire-la-Ville, Switzerland, SCA 03, pp. 320-328.
Eitz, et al., How do humans sketch objects? ACM Trans. on Graphics, 2012, (Proc. SIGGRAPII) 31, 4,44:1-44:10.
Funkhouser, et al., Modeling by example. ACM Tian an Graphics (Proc. SIGGRAPH) (Aug. 2004).
Grinspun, et al., Discrete shells, In Proceedings of The 2003 ACM SIG-GRAPH/Eurograpltics Symposium Computer Animation, Eurographics Association, Aiea-Ville, Switzerland, Switzerland, SCA '03, pp. 62-67.
Guay, et al., The line of action: An intuitive interface for expressive character posing, ACM Trans. on Graphics (Nov. 2013), 32(6):205:1-205:8.
Gunnarsson, et al., Sketch-based posing of 3d faces for facial animation, In TPCG, Eurographics Association, John Collomosse, Ian Grimstead, 2010, pp. 1-8.
Hahn, et al., Efficient simulation of secondary motion in rig-space. In Proceedings of the ACM SIGGRAPH/Eurographics Symposium on Computer Animation, 2013, SCA '13
Hecker, et al., Real-time motion retargeting to highly varied user-created morphologies. In ACM SIGGRAPH 2008 Papers, ACM, New York, NY, USA, SIG-GRAPH '08, 27:1-27:11.

Igarashi, et al., Teddy: A sketching interface for 3d freeform design. In Proceedings of he 26th Annual Conference on Computer Graphics and Interactive Techniques, ACM Press/Addison-Wesley Publishing Co., New York, NY, USA, 1999, SIGGRAPH '99, pp. 409-416.
Karpenko, et al., Smoothsketch:3d free-form shapes from complex sketches. ACM Trans. Graph. 25, 3 (Jul. 2006), pp. 589-598.
Lee, et al., Sketch-based search and composition of 3D models, In EUROGRAPHICS Workshop on Sketch-Based Interfaces and Modeling, 2008.
Lin, et al., A sketching interface for sitting-pose design. In Proceedings of the Seventh Sketch-Based Interfaces and Modeling Symposium, Eurographics Association, Aire-la-Ville, Switzerland, Switzerland, 800 SBIM '10, 2010, pp. 111-118.
Miranda, et al., Sketch express: A sketching interface for facial animation. Computers & Graphics, (Oct. 2012),36(6):585-595.
Nealen, et al., A sketch-based interface for detail-preserving mesh editing. ACM Trans. on Graphics (Proc. SIGGRAPH) 2005, 24, 3, pp. 1142-1147.
Nealen, et al., FiberMesh: Designing freeform surfaces with 3D curves, ACM Trans. on Graphics (Proc. SIGGRAPH) 2007, 26, 3, article No. 41.
Noris, et al., Smart scribbles for sketch segmentation. Computer Graphics Forum 31, 2012, 8, pp. 2516-2527.
Olsen, et al., Sketch-based modeling: A survey, Computers & Graphics 33, (2009), pp. 85-103.
Oztireli, et al., Differential blending for expressive sketch-based posing. In Proceedings of the 12th ACM SIGGRAPH/Eurographics Symposium on Computer Animation, ACM, New York, NY, USA, 2013, SCA '13, pp. 155-164.
Rusinkiewicz, et al., Efficient variants of the ICP algorithm. In 3-D Digital Imaging and Modeling, IEEE Computer Society, 2001, pp. 145-152.
Shin, et al., Magic canvas: Interactive design of a 3-D scene prototype from freehand sketches. In Proceedings of Graphics Interface 2007, ACM, New York, NY, USA, GI '07, pp. 63-70.
Wei, et al., Intuitive interactive Human-character posing with millions of example poses, Computer Graphics and Applications, IEEE 31, 4 (Jul. 2011), pp. 78-88.
Wyvill, et al., Sketch based construction and rendering of implicit models. In Proceedings of the First Euro-graphics Conference on Computational Aesthetics in Graphics, Visualization and Imaging, Eurographics Association, Aire-la Ville, Switzerland, Switzerland, Computational Aesthetics'05, 2005, pp. 67-74.
Zimmermann, et al., SilSketch: Automated sketch-based editing of surface meshes. In Proceedings of the 4th Eurographics Workshop on Sketch-based Interfaces and Modeling, ACM, New York, NY, USA, SBIM '07, 2007, pp. 23-30.

* cited by examiner

SKETCH-BASED ABSTRACTION FOR CHARACTER POSING AND SYNTHESIS

PRIORITY

This application claims the benefit, under 35 U.S.C. § 119(e), of U.S. Provisional Patent Application No. 62/170,458, filed 3 Jun. 2015, which is incorporated herein by reference.

TECHNICAL FIELD

This disclosure generally relates to animation tools.

BACKGROUND

In traditional two-dimensional ("2D") animation, artists may craft each pose of a character by hand using pencil and paper or any other suitable medium. This tangible connection may provide a powerful interface that may give artists substantial control over a character's shape. In three-dimensional ("3D") animation, posing a character may be a more involved endeavor, since it may entails the coordinated movement of thousands or more vertices. To make this process tractable, rigging artists may build rigs that may define the space of meaningful deformations for a character in terms of abstract rigging parameters (e.g., a full character rig or a rig for a portion of a character). In some situations, animators may determine a character's pose indirectly by choosing values for these parameters.

Rigging is the process of taking a static 3D mesh and preparing it for animation. This process involves creating a hierarchical set of interconnected "bones" (referred to as the skeleton or character rig) which is then used to animate the mesh. Additionally, rigging a character may involve placement of the character rig (or the skeleton), creation of a joint hierarchy, forward kinematics, inverse kinematics, defining degrees of freedom and constraints, and/or facial rigging. In reference to the joint hierarchy, in order for a character rig to function properly the joints must follow a logical hierarchy. For example, the first joint created in the character rig is called the joint root and thereafter every subsequent joint may be connected directly or indirectly to the joint root. Forward kinematics (FK) refers to one of the basic ways to calculate the joint movement of a fully rigged character. For example, moving a character's hand may involve the movement of not only the character's hand, but also the character's shoulder, elbow, etc. With inverse kinematics (IK), degrees of freedom and constraints are used to ensure that a characters rig stays within the bounds of nature, that is, not allowing a character head to rotate a full 360 degrees. Lastly, facial rigging may include an entirely separate rig defined solely for the face of a character.

From the artist's perspective, crafting by hand or 3D animation may offer potential tradeoffs in terms of the creative process. In the hand-drawn case, artists may have substantial, tangible control over most aspects of a character's shape. However, a great deal of skill may be required to draw a character's proportions appropriately. Additionally, an extra clean-up process may be needed to ensure that the drawings are "on model." "On model" refers to the concept of confirming that the artists sketch of the character's shape depicts a single unity. In 3D animation, rigging may naturally encapsulate the space of meaningful shapes, potentially obviating the need for the clean-up step. In order to accommodate the broad range of expressive deformation, a production character rig may employ hundreds, thousands, or more different rigging controls, which may vary in complexity from blend shapes to skeletal deformation to complex procedural functions.

SUMMARY OF PARTICULAR EMBODIMENTS

In particular embodiments, a sketch-based abstraction method may enable sketch-based posing of 3D characters or the design and customization of 3D characters.

In particular embodiments, a method augments a 3D character with a 2D representation and provides a general-purpose energy formulation that measures the distance between the character's 2D representation and a user-drawn 2D sketched curve. By minimizing this energy with the rigging controls of the character as unknowns, the system may provide a bridge between 2D sketches and the 3D model deformed by the same rig parameters.

The method may be applied to different posing tasks and may also be used to create customized character designs. In particular embodiments the method may be applied to mechanical assemblies. In particular embodiments, the character rig's subspace may include the entire character rig as defined by the initial rigging of the character. The 2D representation may be created on the fly by sketching on top of the character's mesh. In other embodiments, the 2D representation may be built directly into the character rig as a set of rigged curves during character design. In particular embodiments, the character rig describes all of the rigging parameters and features of a particular character.

In particular embodiments, once the 2D representation has been created, user input in the form of a new sketched 2D curve may be received, and then an energy formulation may be used that measures the distance from each of a set of points in the character's 2D representation to a respective set of corresponding points in the new 2D curve. The algorithm may minimize the energy using the character's rigging controls as unknowns. Since the rigging may influence both the 3D shape and the 2D representation, the algorithm provides a bridge between the 2D world of sketching and the character's 3D rigging controls. By minimizing the energy metric, the described embodiment may deform the 3D character. Therefore, the character rig may be treated as a black-box system, that is, in particular embodiments, the method may enable arbitrary rigging controls, including but not limited to, skeletal deformations, blend shapes, and arbitrary nonlinear procedural functions.

Applications of the method may include draw-over posing for an entire character or for components thereof, creation of characters and character components, and manipulation of non-intuitive subspaces defined by the constraints of mechanical assemblies.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of the preferred embodiments of the present disclosure has been provided for the purpose of illustration and description. It is not intended to be exhaustive or to limit the invention to the precise forms disclosed.

DESCRIPTION OF EXAMPLE EMBODIMENTS

Particular embodiments provide sketch-based abstraction method that works on top of arbitrary rigs, allowing sketch-based posing and/or the design and customization of novel creatures. Generally, the embodiment described herein relates to a sketch-based abstraction on top of artist-designed subspaces. In particular embodiments, in order to complement and enhance existing production workflows, embodiments described herein may focus on 3D character models created and rigged using standard animation software.

For purposes of illustration, multiple examples of the sketch-based abstraction method are disclosed. These examples include, but are not limited to, draw-over posing, redraw posing, sketch-based character individualization, and sketch-based design of mechanical characters. As used herein, the term "sketch" may refer to a stick-figure-style drawing of a character or portions thereof; the sketch may be received as user input by way of any appropriate input device, such as, for example, an electronic, mechanical, or capacitive stylus used with a touch pad/touch screen.

With respect to embodiments providing methods of draw-over posing, a user may draw a sketch on a character (either the entire character or a portion thereof) and then redraw the sketch in the desired posed position. For purposes of illustration herein, with respect to the draw-over posing embodiment, the user's first drawn sketch shall be referred to as the source sketch and the user's redrawn sketch shall be referred to as the target sketch. In particular embodiments, as a result of the draw-over posing, the character's rig may be automatically updated to optimally match the two sketches. Draw-over posing may be used for, by way of example but not limitation, skeletal posing, curve deformers, facial blend shapes, and other more elaborate deforms that are not typically accommodated by inverse kinematics systems.

In particular embodiments providing methods of redraw posing, a user may construct the 2D character representation by embedding curves in the character's structure and rigging them alongside the character's mesh. Therefore, at runtime a user need only draw the target sketch.

With respect to embodiments providing methods of creating sketch-based character components, the sketch-based abstraction may be applied to individual components of a character, wherein the individual components may be authored separately. In particular embodiments, for example, a user may create a variety of custom characters by sketching individual components such as body segments, legs, heads, wings, and tails. Because the user may have the ability to define the appropriate 2D abstraction for each component, the 2D representation may be much simpler than the actual 3D shape. Therefore, a simple pictorial sketch may result in a complex character design.

Furthermore, particular embodiments may provide methods of manipulating non-intuitive subspaces defined by the constraints of mechanical assemblies.

Figure 1:
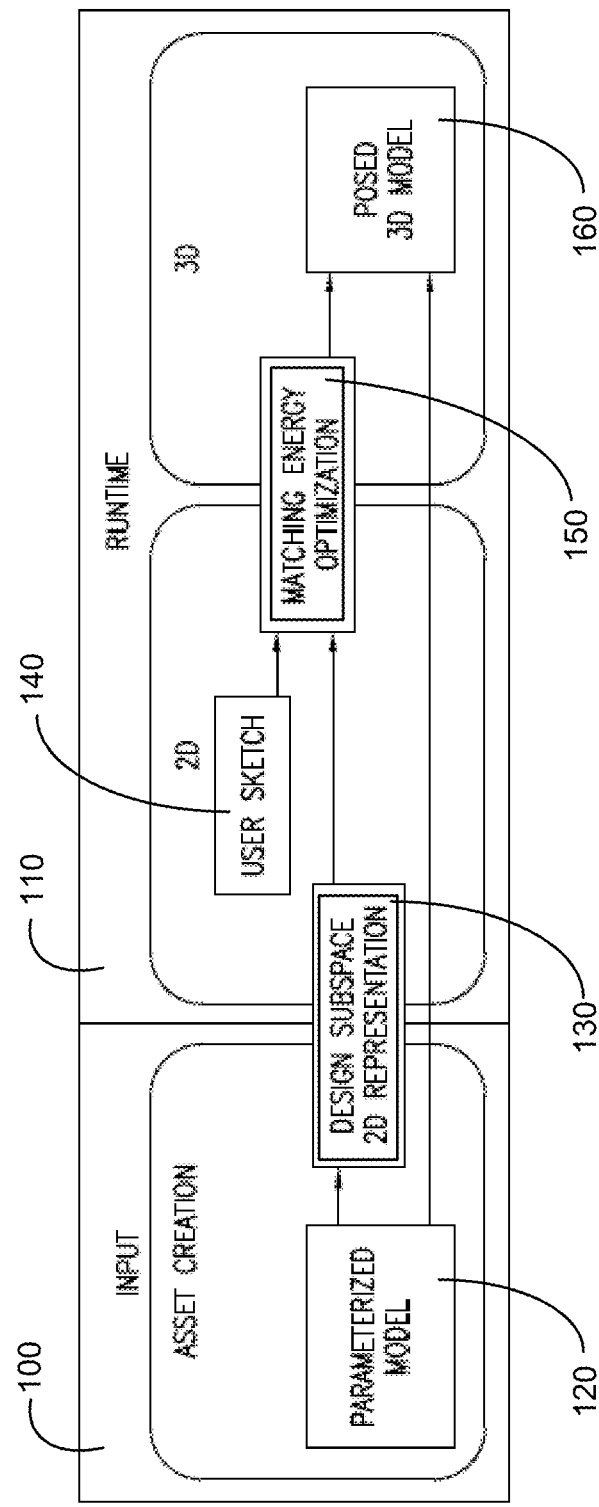
FIG. 1 illustrates an example method of a sketch-based abstraction on top of arbitrary rigs.

FIG. 1 illustrates an example pipeline for a method for creating and utilizing a sketch-based abstraction on top of a rig. The rig may have a broad range of expressive deformations and may employ hundreds or thousands of rigging controls, which may vary in complexity from blend shapes to skeletal deformations to complex procedural functions. A 3D model's vertices may define the space of all possible deformations, while the rig defines the subspace of meaningful ones. In order to accommodate the full range of expressive deformation for a character or a portion of a character, the corresponding rig may employ a range of controls, including, but not limited to, skeletal kinematics, blend shapes, or arbitrary nonlinear procedural deformations. In particular embodiments, the system may treat the rig as a black box, taking the character mesh and a list of rig parameters as input.

The method may begin in an input creation phase 100, followed by runtime phase 110. Input phase 100 may comprise creation of an asset, in which a rig (parameterized 3D model 120) forms the basis for creating a design subspace 130 (2D representation of the rig) by projection into the camera's viewing plane. In particular embodiments, once the system contains the parameterized model 120, in order to provide a connection between the character's rigging controls and the 2D sketches, the system may enhance the classical rig parameterization with a 2D representation of the model that may be deformed by the same controls as the surface mesh. This extended mapping may be referred to herein as a "design subspace."

In a first step during runtime phase 110, once user input in the form of 2D sketch 140 is received, a matching energy optimization may be performed (step 150), in which a correspondence between the 2D sketch 140 and the 2D representation of the rig is determined. In a second step during runtime phase 110, the optimized parameters for the 2D representation are then applied to the rig, resulting in posed 3D model 160.

The step 150 of performing the matching energy optimization may begin by generating or accessing the parameterized 3D model 120, which may contain a surface mesh with n vertices $x=(x_1; x_2; \ldots; x_n)^T$. The rig may define an abstract mapping from a set of rig parameters p to a corresponding surface deformation $x(p)$. Enhancing the rig with a 2D representation of the model 120 consisting of k points $z=(z_2; z_2; \ldots; z_k)$, the system may generate the extended mapping: $p \rightarrow \{x(p), z(p)\}$. In particular embodiments, the specific choice of mapping from the parameters p to the 2D points z may depend on the application.

Once the system has enhanced the classical rig parameterization with a 2D representation of the model, that is, design subspace 130 has been defined, the user may then sketch input to achieve a new pose. To achieve a new pose a user may first draw the source sketch, indicating the region of the character to move, and then draw the target sketch, indicating where the user would like the target sketch to move to in order to achieve a new pose.

In particular embodiments, a user may not need to first sketch on the character, the user may build a 2D representation directly into the rig. This procedure allows the user to define a "2D language" for posing. In particular embodiments, the system may automatically determine the optimal pose in response to the user-specified 2D representation.

In particular embodiments, the 2D representation may be created on the fly by drawing a curve onto the surface of the character which is then carried along as the character deforms. Alternatively, the user may embed a set of curves into the character itself and may rig them alongside the character's mesh. A projection into the camera's viewing plane may yield a 2D representation of the character's current pose.

In particular embodiments, once the rig may simultaneously influence both the 3D character and the 2D representation, the system may connect these two representations via the rig, allowing the system to control the character's 3D shape by minimizing a 2D energy based on sketch matching. Given a new 2D sketch, the system may define an optimization problem in the form of a nonlinear iterative closest point (hereinafter "ICP") objective that may attempt to align the character's 2D representation to match the user defined sketch.

In particular embodiments, optimization may be defined over the rig parameters, thereby minimizing the ICP energy that compares 2D objects. Minimizing the ICP energy that compares 2D objects may also deform the 3D shape to match the sketch. An application-dependent regularization term may be used to resolve ambiguities in a way appropriate for each particular application.

In particular embodiments, taking a sampling of the input stroke provides a set of 2D points of size m given as $y=(y_1, y_2; \ldots; y_m)$ that may be used to match the model's 2D representation z. An ICP-based approach may be used to perform the matching energy optimization:

$$W_{match}(\omega z(p)) = \Sigma_{i=1}^{m} \Sigma_{i,j=1}^{k} \omega_{i,j} \|y_i - z_j(p)\|_2^2 \quad (Eq. 1)$$

where $\omega_{i,j}$ denotes the correspondence weight between points $y_i$ and $z_j$ that associates them with each other. To minimize $W_{match}$, the system may then alternate between fixing p (and thus z) to compute correspondence weights $\omega$, and fixing $\omega$ to optimize for p.

In particular embodiments, a selection of one of two correspondence procedures may be predefined during the asset creation phase. The first correspondence procedure may perform an arc-length parameterized resampling using the same number of sample points for both user sketch 140 and the model's 2D curve representation. One-to-one correspondences between y and z may be established for $\omega_{i,j}$ by considering the drawing direction of both lines. The second correspondence procedure may be selected for more complicated gestures, and it may be based on equidistant sampling of both user sketch 140 and the model part's 2D representation. This may result in sets of points of different sizes. Therefore, to handle the multiple sets of different points, computing many-to-many correspondences between y and z to minimize $W_{match}$ with respect to $\omega$ may be required using a greedy two-step approach.

The first step may require computing one-to-many correspondences from y to z that may be called forward correspondences $a_{i,j} \in \{0, 1\}$ by assigning the closest match z to every point $y_i$. The second step may require analogously computing backward correspondences $b_{i,j} \in \{0, 1\}$ from z to y and then combining them to final correspondence weights as $$\omega_{i,j} = a_{i,j} + b_{i,j}. \quad (Eq. 2)$$

where $\forall \in \Sigma_{i=1}^{m} a_{i,j} = 1$ and $\forall \in \Sigma_{i=1}^{k} b_{i,j} = 1$. (Eq. 3)

After determining the correspondence weights, the system may minimize the matching energy 150 $W_{match}$ by modifying the parameters p that control the 2D representation points z of design subspace 130. In particular embodiments, given that the correspondence weights $\omega$ are fixed, the optimization problem:

$$\underset{p}{\arg\min} \; W_{match}(\omega, z(p)), \quad (Eq. 4)$$

may be solved using a Newton-Raphson scheme. To prevent the costly computation of higher-order derivatives, a method may be employed to linearly approximate the subspace mapping as $$z(p) \approx z(p_0) + J(p_0) \cdot (p - p_0), \quad (Eq. 5)$$

where it can then estimate the Jacobian $$J = \frac{\partial z}{\partial p}$$

using finite differences around the initial parameter vector $p_0$. Given that $W_{match}$ is a quadratic function in terms of z, its derivatives with respect to z are trivially obtained, and the gradient and the Hessian with respect to the parameters p may be derived using the chain rule as $$\frac{\partial W}{\partial p} = J^T \frac{\partial W}{\partial z} \text{ and } \frac{\partial^2 W}{\partial p^2} = J^T \frac{\partial^2 W}{\partial z^2} J. \quad \text{(Eq. 6)}$$

In particular embodiments, performing the matching energy optimization 150 in terms of a 2D representation may lead to an under constrained problem, since potentially many subspace parameter configurations p—originally deforming the surface points x—may map to the same 2D point set z. In numerical terms, this may manifest as a large number of local minima in $W_{match}$, which may lead to unpredictable behavior and high sensitivity of the solution to changes in the initial parameter vector $p_0$. In addition, many of these local minima may express themselves as solutions where the surface representation x in 3D is highly distorted even though the 2D points z match well. To prevent such artifacts, a regularization energy component $\lambda \cdot W_{reg}$ may be added to the optimization problem in Eq. 4.

In particular embodiments, a parameter-based L2 regularizer $\|p-p_0\|^2$ may be used to favor solutions that may require the least amount of change from the initial pose. Depending on the specific application, employing a vertex-based regularization may be used depending on x. Parameter-based regularization may be inexpensive to include, whereas vertex-based regularization comes at a higher cost. Where the objective function W also directly depends on x(p), the derivatives may need to be adjusted by adding $$J_x^T \frac{\partial W}{\partial x} \text{ and } J_x^T \frac{\partial^2 W}{\partial x^2} J_x,$$

respectively, where the vertex Jacobian $$J_x = \frac{\partial x}{\partial p}$$

additionally needs to be estimated using finite differences.

Figure 2A:
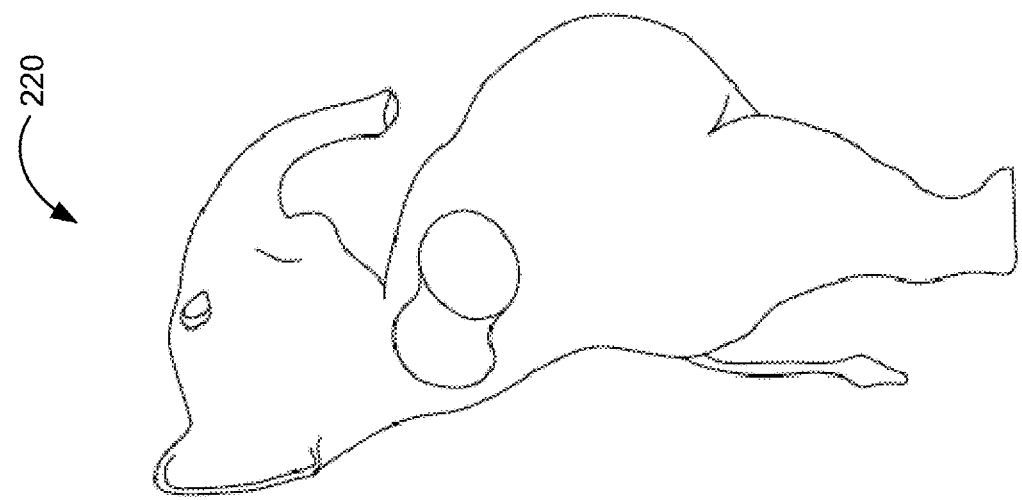
FIG. 2A illustrates an example of the draw-over posing embodiment using a production quality character rig based on a skeletal structure focusing on the region of the head.
Figure 2A:
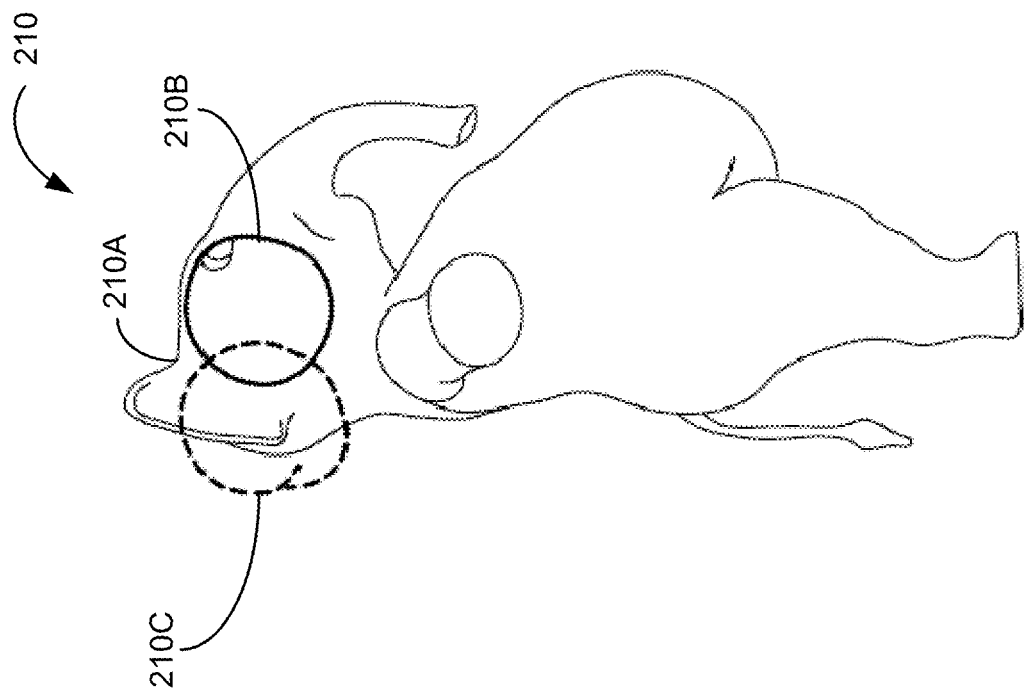
Figure 2B:
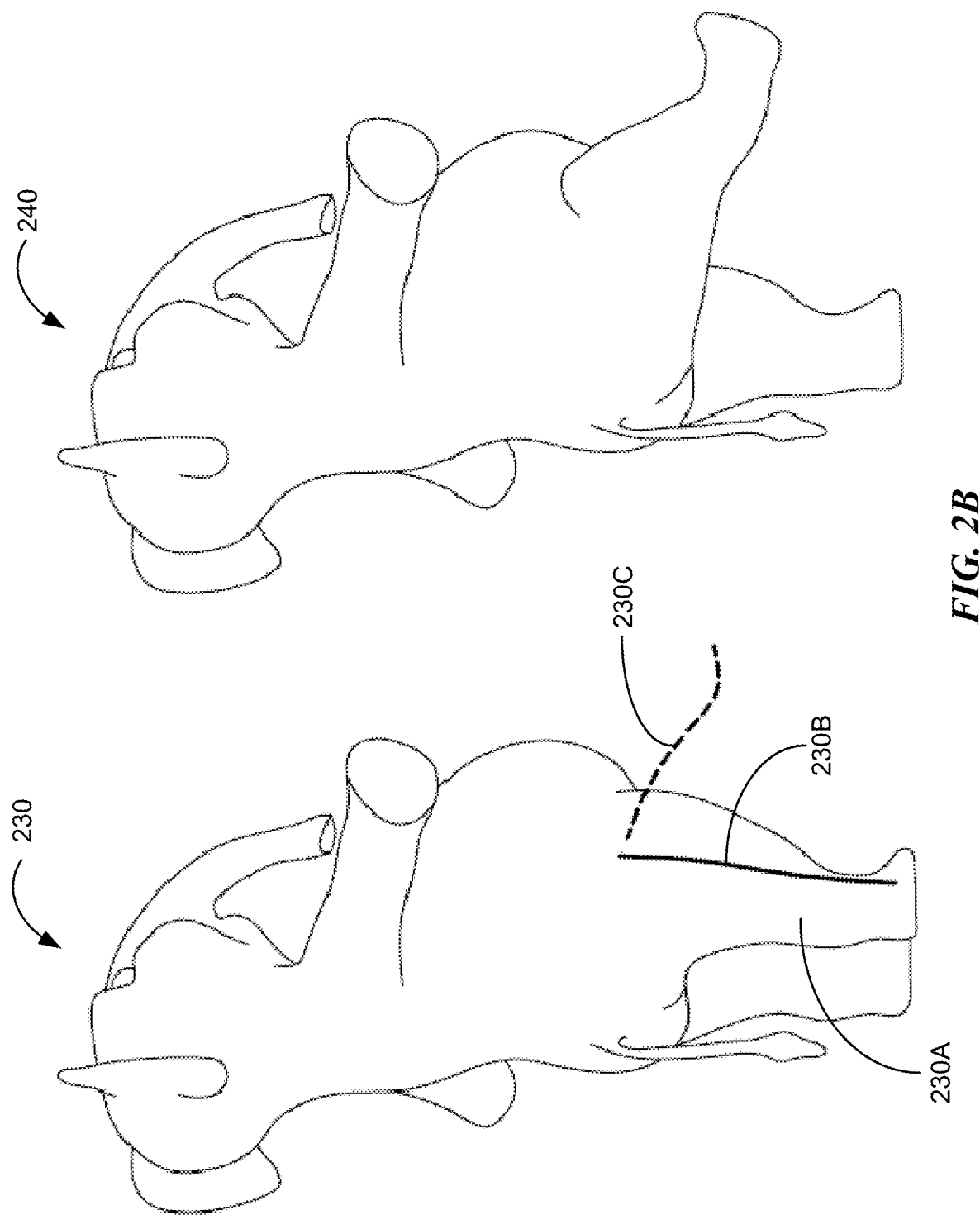
FIG. 2B illustrates an example of the draw-over posing embodiment using a production quality character rig based on a skeletal structure focusing on the right leg of the elephant.
Figure 2C:
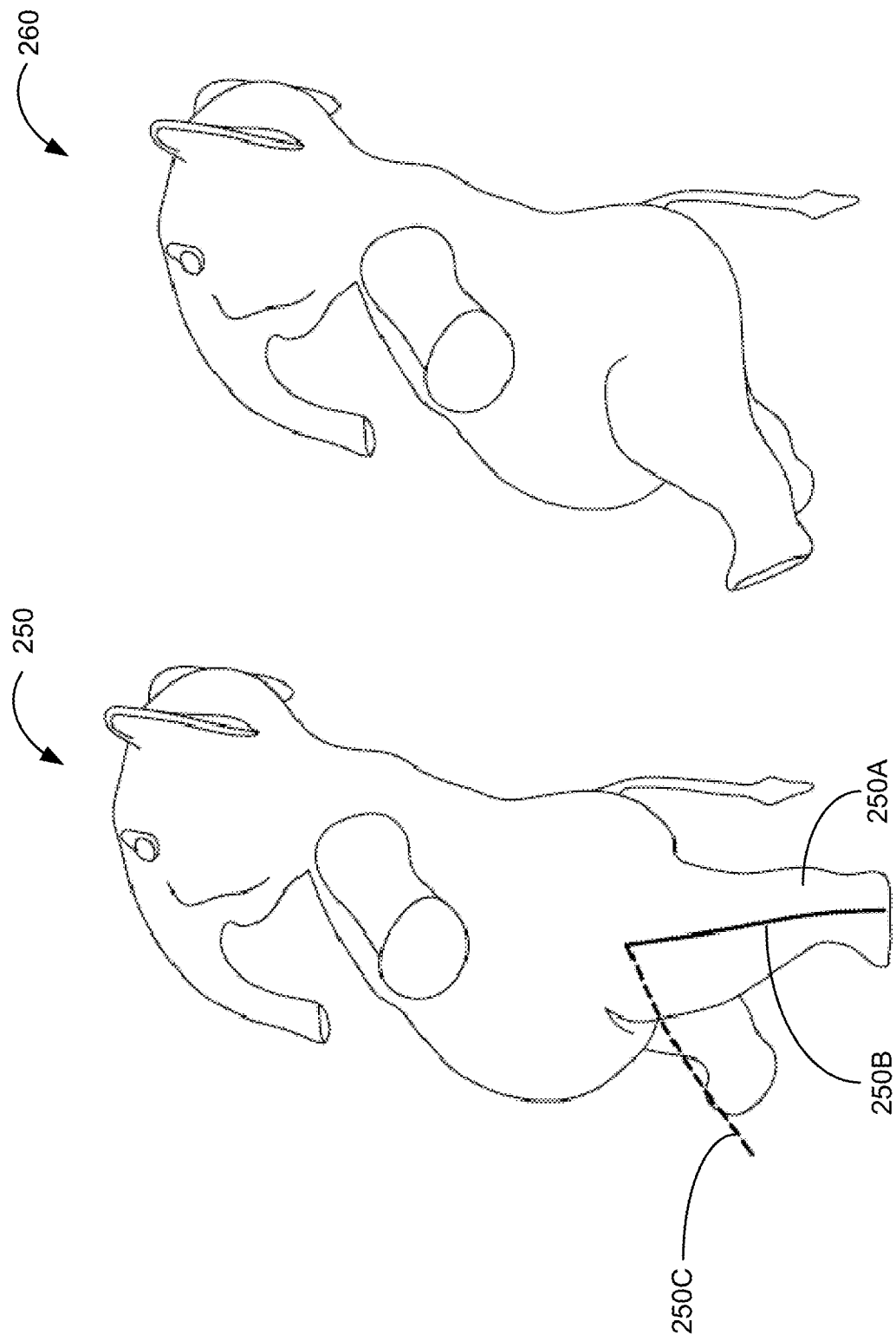
FIG. 2C illustrates an example of the draw-over posing embodiment using a production quality character rig based on a skeletal structure focusing on the left leg of the elephant.
Figure 2D:
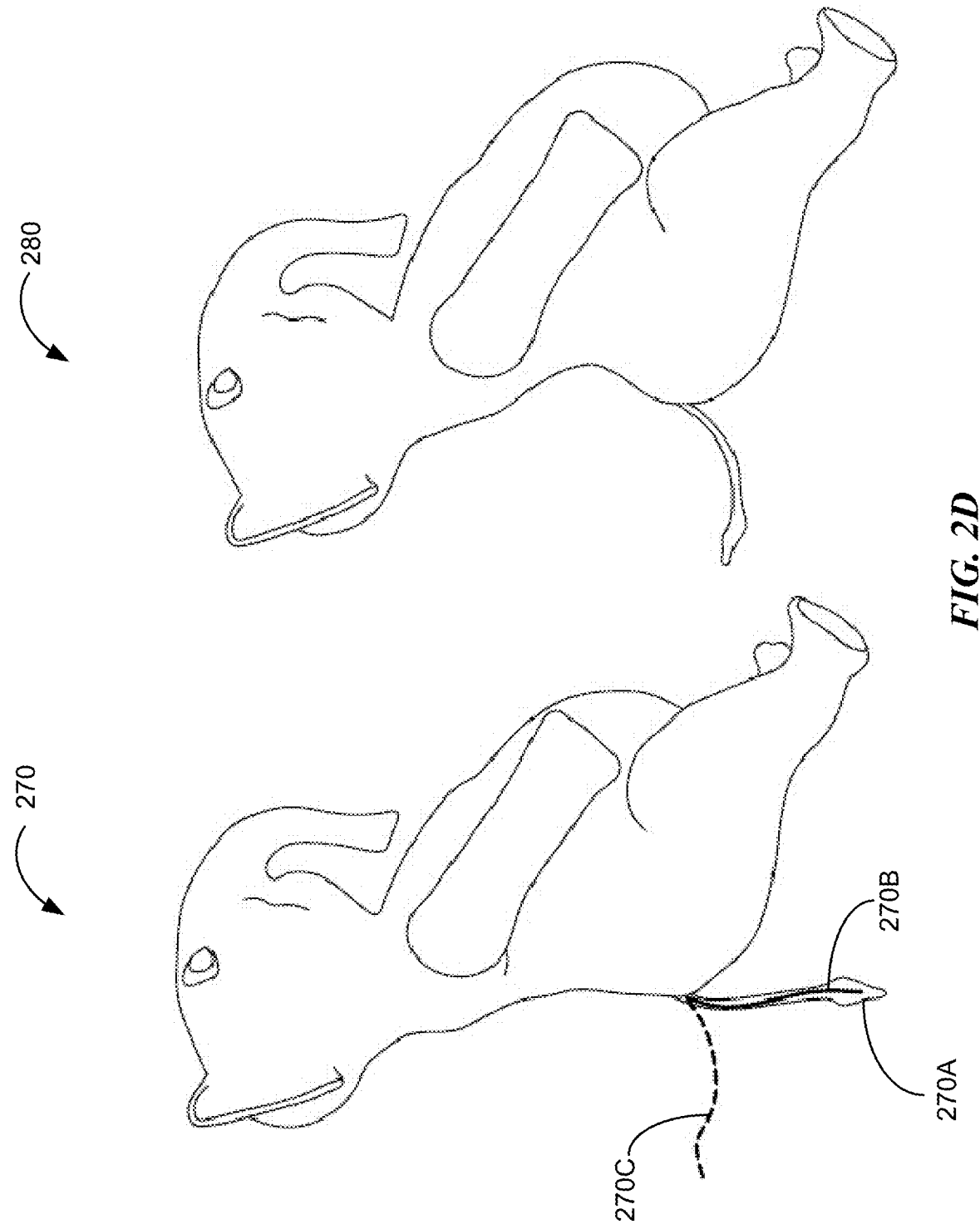
FIG. 2D illustrates an example of the draw-over posing embodiment using a production quality character rig based on a skeletal structure focusing on the tail of the elephant.
Figure 3:
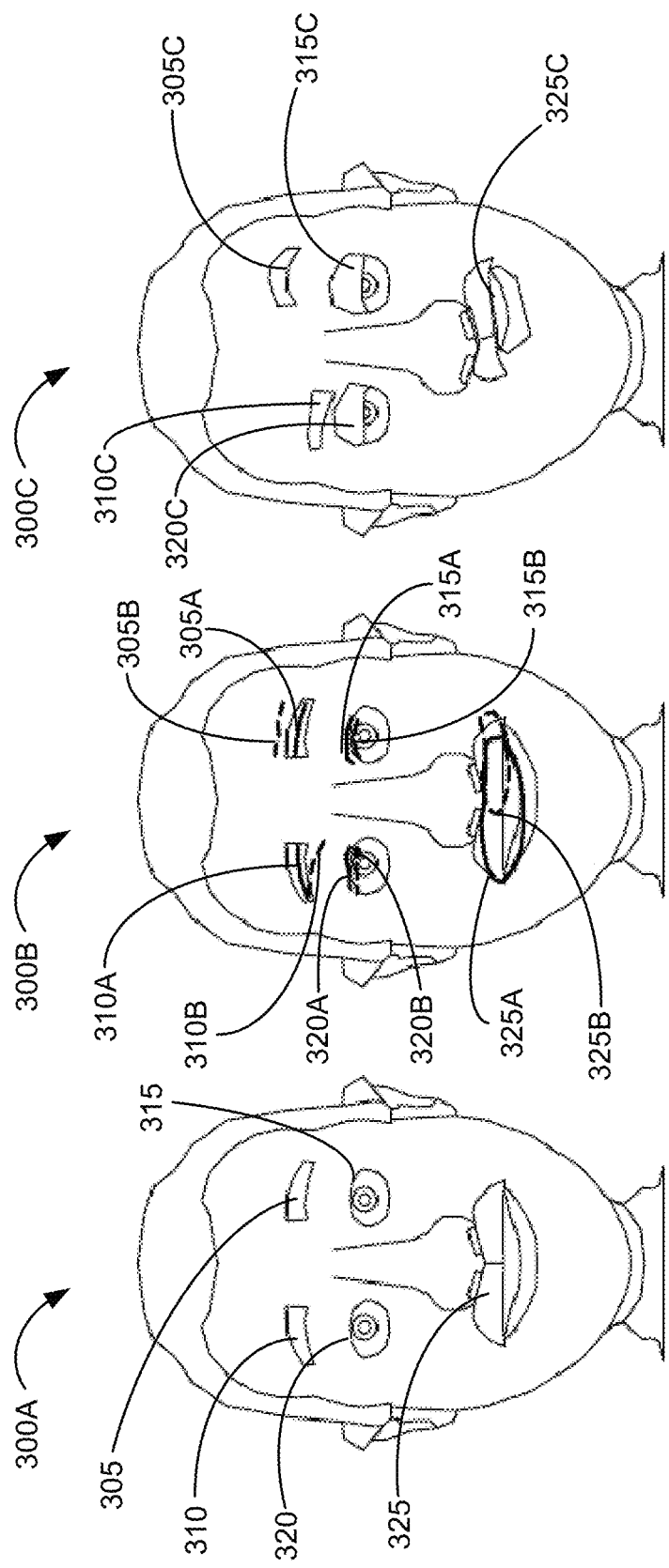
FIG. 3 illustrates an example of face-posing using the draw-over posing embodiment using a facial rig based on a large set of blend shapes.

FIGS. 2A-2D and FIG. 3 illustrate an example of the draw-over posing embodiment. FIGS. 2A-2D illustrate an example of an embodiment of the method applied to a rig for a character (Elephant), which is a production quality character rig based on a skeletal structure. FIG. 3 illustrates the facial rig for a character (Mike), which is based on a large set of blend shapes that have been sculpted individually.

In particular embodiments, draw-over posing targets on-the-fly sketch-based posing of an arbitrarily rigged character. As explained above, to obtain a design subspace 130 suitable for draw-over posing, the user may create a custom 2D representation on the fly by placing a stroke on the character. The system may store the corresponding UV values and may use them to reconstruct the curve after deformation by the rig. In particular embodiments, projecting the drawn curve into the camera plane yields its 2D representation. Once the user draws a second curve as a target, the system may optimize the rig's parameters to make the two curves match.

FIG. 2A illustrates an example of the draw-over posing embodiment for initial pose 210, focusing on Elephant's head 210A region. The solid line represents source sketch 210B, which is the first sketch a user may draw. Source sketch 210B indicates to the system the region of the character rig that the user wishes to move to a new position. The dashed line represents target sketch 210B, which is the second sketch a user may draw. Target sketch 210C indicates to the system the position the region selected by source sketch 210B is to be moved toward. As illustrated in FIG. 2A, Elephant's head 210A has been moved back a small amount to final pose 220 as a result of source sketch 210B and target sketch 210C. Additionally, final pose 220 may alter the entire representation of the elephant, since tilting back Elephant's head 210A affects multiple portions of the character rig.

FIG. 2B illustrates an example of the draw-over posing embodiment for initial pose 220, focusing on Elephant's right leg 230A region. The solid line represents source sketch 230B, which is the first sketch a user may draw. Source sketch 230B indicates to the system the region of the character rig that the user wishes to move to a new position. The dashed line represents target sketch 230B, which is the second sketch a user may draw. Target sketch 230C indicates to the system the position the region selected by source sketch 230B is to be moved toward. As illustrated in FIG. 2B, Elephant's right leg 230A has been lifted up and toward the right to final pose 240 as a result of source sketch 230B and target sketch 230C. Additionally, final pose 240 may alter the entire representation of the elephant as lifting Elephant's right leg 230A affects multiple portions of the character rig.

FIG. 2C illustrates an example of the draw-over posing embodiment for initial pose 250, focusing on Elephant's left leg 250A region. The solid line represents source sketch 250B, which is the first sketch a user may draw. Source sketch 250B indicates to the system the region of the character rig that the user wishes to move to a new position. The dashed line represents target sketch 230B, which is the second sketch a user may draw. Target sketch 250C indicates to the system the position the region selected by source sketch 250B is to be moved toward. As illustrated in FIG. 2C, Elephant's left leg 250A has been lifted up to final pose 260 as a result of source sketch 250B and target sketch 250C. Additionally, final pose 260 may alter the entire representation of the elephant as lifting Elephant's left leg 250A affects multiple portions of the character rig.

FIG. 2D illustrates an example of the draw-over posing embodiment for initial pose 270, focusing on Elephant's tail 270A region. The solid line represents source sketch 270B, which is the first sketch a user may draw. Source sketch 270B indicates to the system the region of the character rig that the user wishes to move to a new position. The dashed line represents target sketch 230B, which is the second sketch a user may draw. Target sketch 270C indicates to the system the position the region selected by source sketch 270B is to be moved toward. As illustrated in FIG. 2D, Elephant's tail 270A has been raised to final pose 280 as a result of source sketch 270B and target sketch 270C. Additionally, final pose 280 may alter the entire representation of the elephant as lifting Elephant's tail 270A affects multiple portions of the character rig as illustrated FIG. 2D. For example, by lifting Elephant's tail, the back is now arched and the belly is protruding.

FIG. 3 illustrates an example of face-posing using the draw-over posing embodiment using a facial rig for a character (Mike) based on a large set of blend shapes. As shown in FIG. 3, initial facial expression 300A is manipulated as shown in sketch compilation 300B, thereby resulting in final facial expression 300C. The initial poses for right eyebrow 305 and left eyebrow 310 are represented by solid sketch lines 305A and 310A, which are subsequently drawn over by dashed sketch lines 305B (raising the right eyebrow to final pose 305C) and 310B (dropping the left eyebrow to final pose 310C). The initial poses for right eyelid 315 and left eyelid 320 are represented by solid sketch lines 315A and 320A, which are subsequently drawn over by dashed sketch lines 315B (dropping the right eyelid to final pose 315C) and 320B (dropping the left eyelid to final pose 320C). The initial pose for mouth and mustache 325 is represented by solid sketch line 325A, which is subsequently drawn over by dashed sketch line 325B (tweaking the mouth and mustache into final pose 325C).

In particular embodiments, small local deformations are preferred over global deformations. Thus, local deformations may be favored by penalizing deformations in regions far away from the curve that is used to generate the 2D representation. In particular embodiments, the system may compute the distance d of a vertex in its initial position $x_i^1$ to the curve on the mesh and penalize deviations of far away vertices via a weighting function $f$ to obtain the energy term $$W_{reg} = f(d(x_i^0)) \Sigma_{i=1}^n (x_i(p) - x_i^0)^2. \quad (Eq. 7)$$

Strong results may be achieved by the system when linearly blending between 0 for the closest and 1 for the furthest vertex as weighting function $f$. At the cost of increased runtime to minimize the matching energy 150, the system may optionally further improve the quality of the posing by adding a surface-based physical shell energy as a regularizer. In particular embodiments, static energy components of the discrete shells integrate directly into the system and may prevent surface distortions.

In particular embodiments, a user may construct the 2D character representation by embedding curves in the character structure and rigging them alongside the character's mesh; in particular embodiments, this may eliminate the need to draw source sketch lines. Projecting these curves into the camera plane yields the 2D representation. In particular embodiments, the user may be required to draw the different curves for the target sketch in a prescribed order in order to facilitate the correspondence computation.

Because posing a 3D character in 2D is inherently ambiguous, these ambiguities should be resolved by further regularization. To do so, motion may be restricted to the viewing plane by penalizing any movement along the view normal n, yielding the additional vertex-based energy term:

$$W_{reg} = \sum_{i=1}^n (n \cdot (x_i(p) - x_i^0))^2, \quad (Eq. 8)$$

where $z_i^0$ denotes the vertex position i prior to optimization. Similar to the draw-over posing embodiment, the physical shell regularization energy described above may be used to optionally improve the posing quality.

Figure 4:
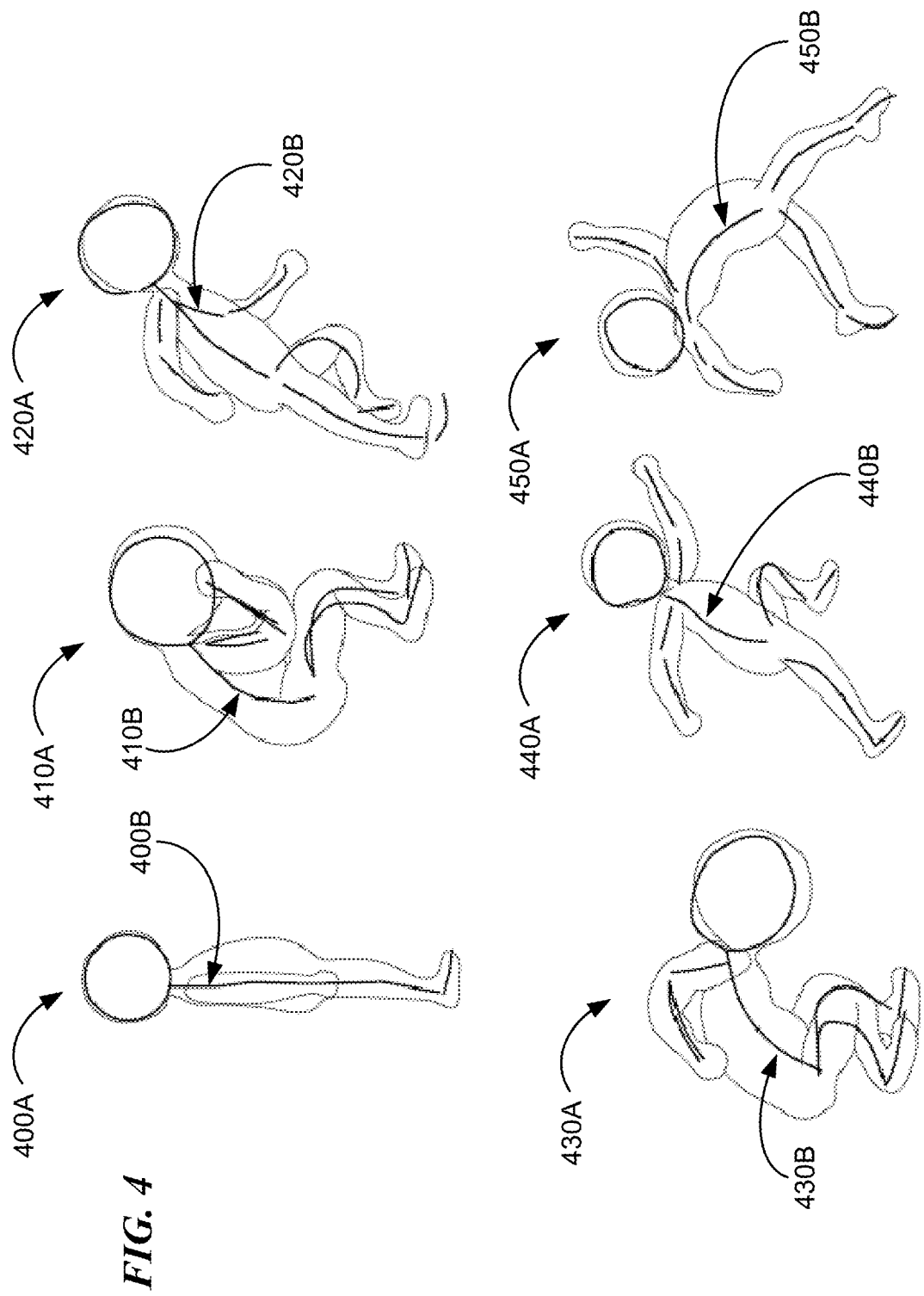
FIG. 4 illustrates an example of redraw posing by embedding the 2D representation.

FIG. 4 illustrates several expressive poses that may be derived from stick-figure sketches; as shown in FIG. 4, rest pose 400A and embedded 2D representation 400B may be transformed into five different poses using sketch input. Because the 2D representation has previously been embedded into the character structure and rigged alongside the character's mesh, a user need only to draw the target sketch. For example, a user may want to display the figure in a seated position—to move the figure from rest pose 400A to seated pose 410A the user may draw sketch 410B. If the user wants to display the figure in running pose 420A, the user may draw sketch 420B. Similarly, the user may pose the figure in pre-dive pose 430A, striding pose 440A, or lunging pose 450A by drawing the corresponding sketch (430B, 440B, or 450B, respectively).

Figure 5:
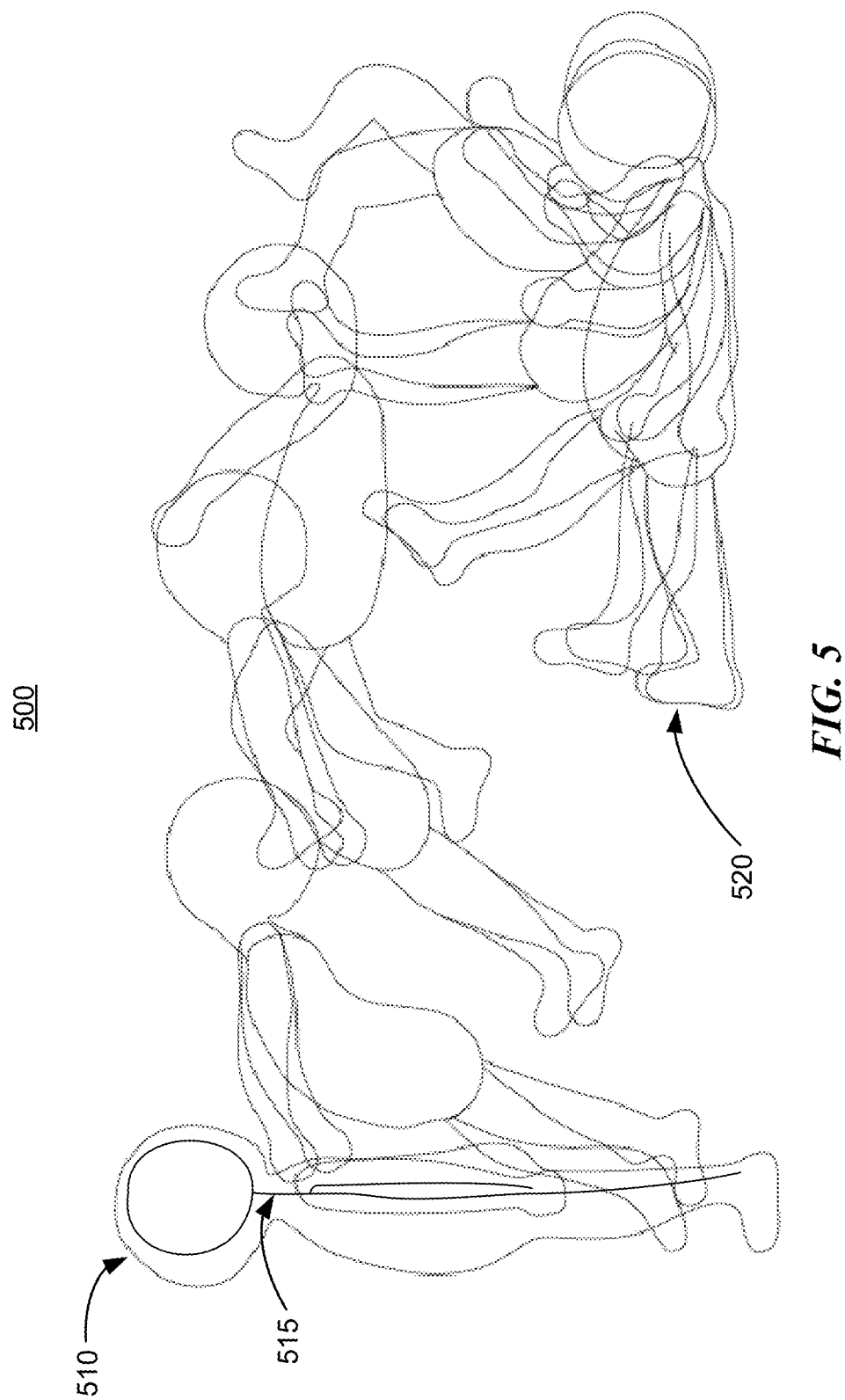
FIG. 5 illustrates an animation created using redraw posing.

As shown in FIG. 5, to validate the redraw posing operation, a Cartoon Man character is used which includes embedded line representations for all body parts. FIG. 5 depicts an animation 500 of the Cartoon Man falling backward. The Cartoon Man starts in rest pose 510 and after eight sketch inputs transforming 2D representation 515, the Cartoon Man has fallen backward and landed on his back in final pose 520.

Figure 6:
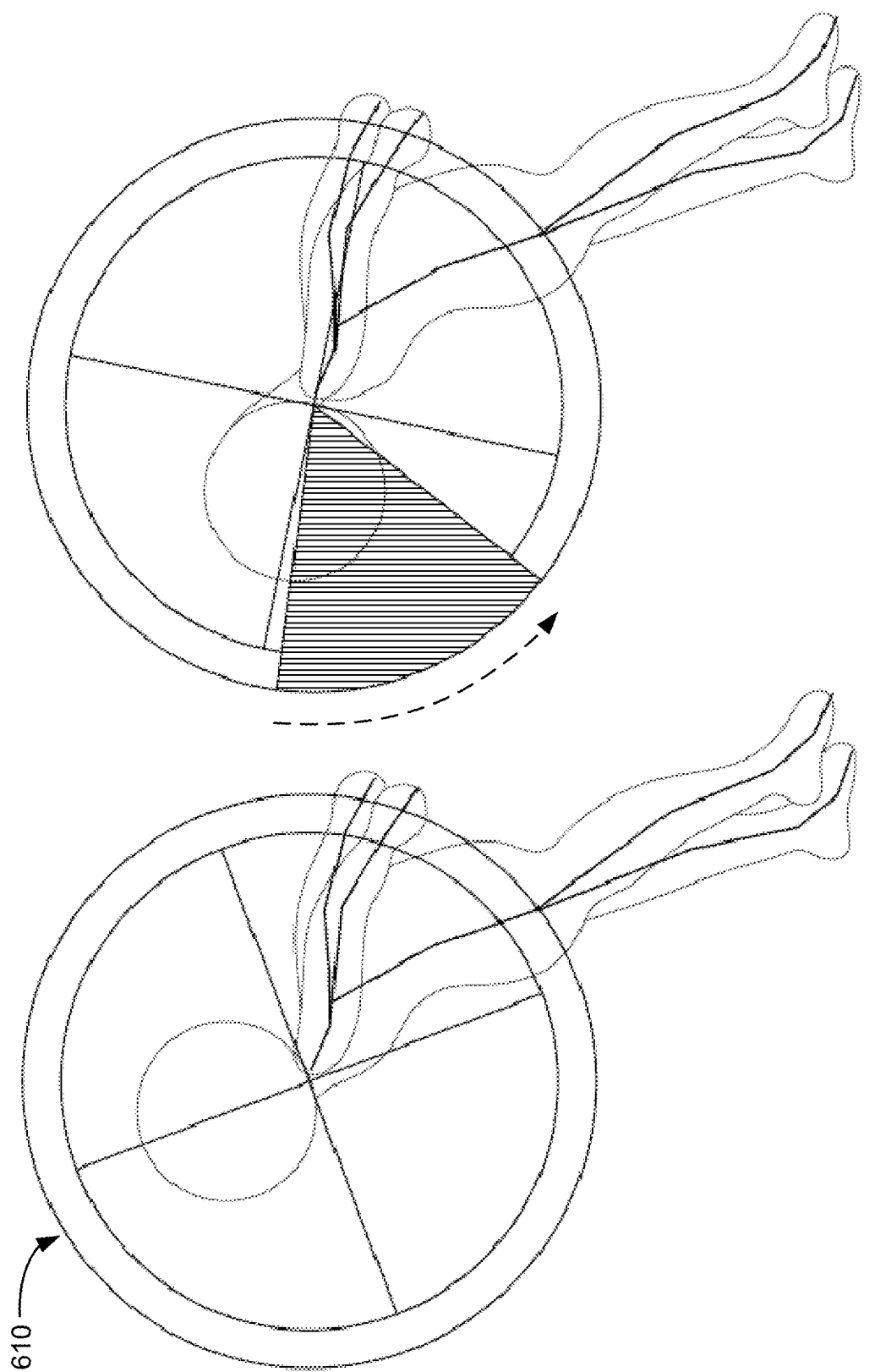
FIG. 6 illustrates an example of sketch-based character individualization.

In particular embodiments, a user may make fine-scale adjustments to a rig as shown in FIG. 6. A user may first select a specific location on or region of the character rig to manipulate (e.g., the character's neck). Upon receiving the selection, the system may display a control element (e.g., control wheel 610), enabling the user to manipulate the rig into the desired position (e.g., by turning control wheel 610 to cause the head and neck to tilt).

In particular embodiments, the system may enable sketch-based character individualization by allowing users to design a virtual character based on simple sketches and predefined adaptive model parts that may expose rig controls that affect the shape in addition to the pose. Sketch-based character individualization enables the user to design individual character parts offline, which can then be easily combined and posed interactively using sketch input as illustrated in FIG. 6.

Figure 7:
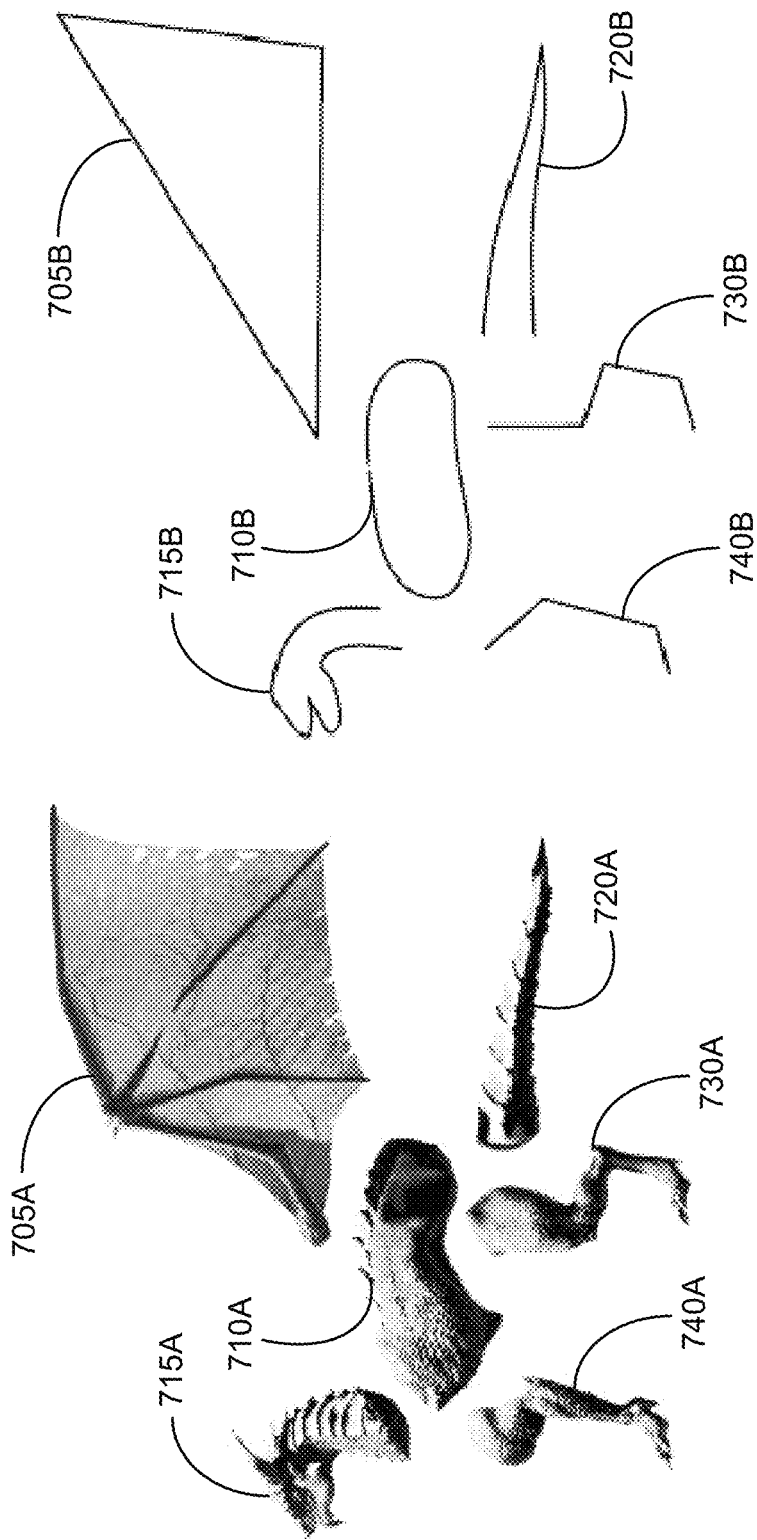
FIG. 7 illustrates an example of the different results achieved through sketch-based character individualization.

FIG. 7 illustrates an example application of sketch-based character individualization for a character comprising parts of a dragon model that have been rigged: torso 710A, wings 705A, head 715A, tail 720A, front legs 740A and hind legs 730A. In addition to the corresponding mesh, each part of the dragon model also contains an embedded stroke gesture that serves as the 2D representation to be deformed by the rig and as an identifier to help determine classification of the drawn part. For example, to instantiate torso 710A, a user must sketch oval 710B. Similarly, in order to instantiate wing 705A, head 715A, tail 720A, front legs 740A, or hind legs 730A, a user must sketch triangle 705B, head 715B, tail 720B, front legs 740B, or hind legs 730B, respectively, as shown in FIG. 7.

In particular embodiments, to allow the parts to match a broad range of user-drawn shapes, the rigs may expose the local scaling parameters of the underlying bones used to skin the models in addition to typical posing controls such as rigid transformation and joint rotations. Instead lieu of imposing a drawing order or requiring the user to specify which body part he or she is drawing, the system may use a database of 2D sketches containing several example instances of each body part together with a category recognition approach to classify, and thereby detect, each drawn stroke.

Figure 8:
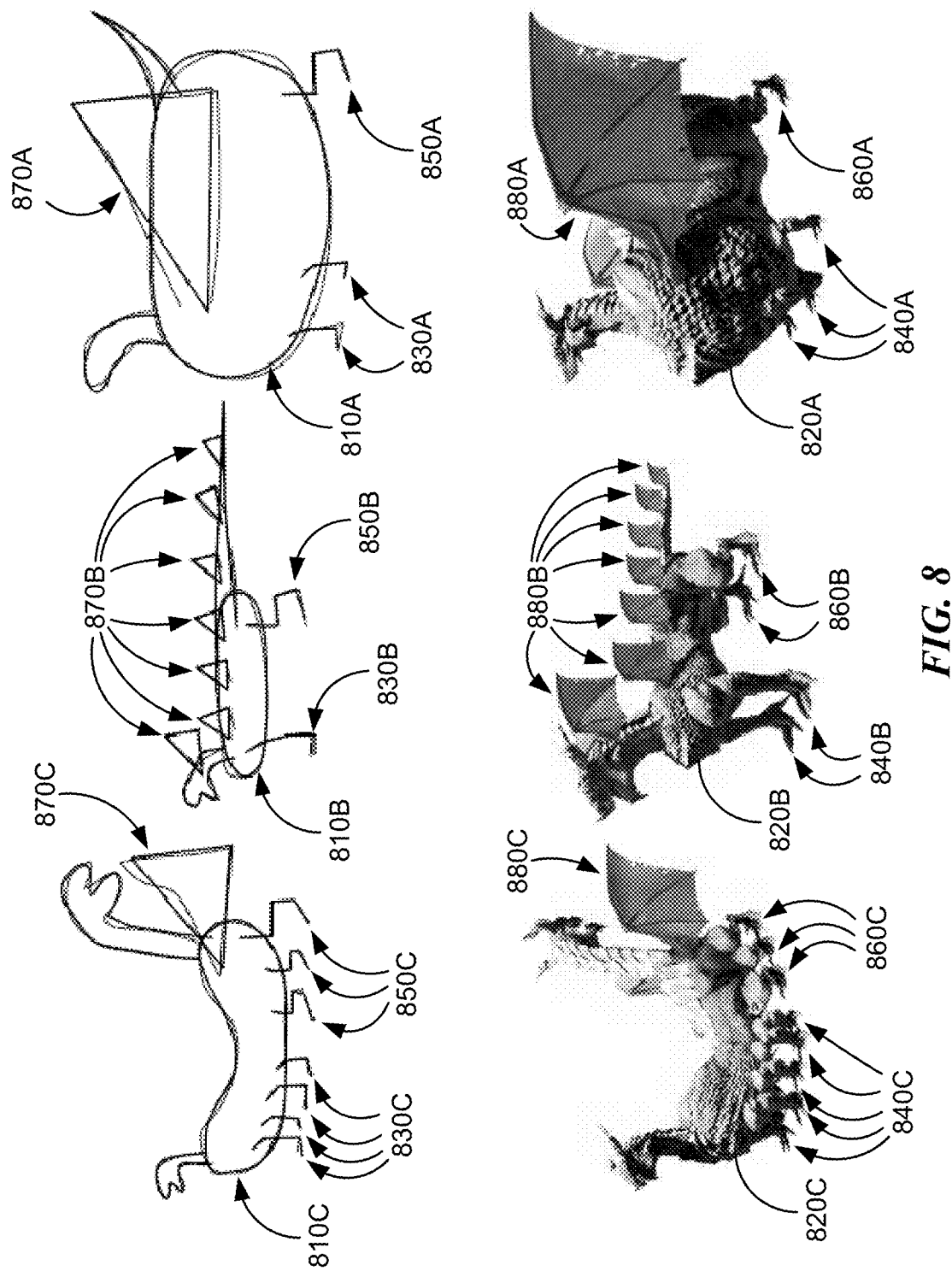
FIG. 8 illustrates a mechanical leg and its corresponding 2D representation with accompanying motion curve.

In particular embodiments, the system then may instantiate the detected part and optimize it for both its shape and pose parameters (in some embodiments, simultaneously) to place it into the scene. FIG. 8 illustrates results using a character individualization method as described herein. With reference to FIG. 8, in order to create a torso part, a user may be able to sketch a large oval (810A), small oval (810B), or an elongated and saggy oval (810C), which are detected, instantiated, and then optimized as a large torso (820A), a small torso (820B), or an elongated and saggy torso (820C). Also, as shown in FIG. 8, a user may be able to sketch a variable number of foreleg sketches (830A-830C) or hindleg sketches (850A-850C), which are detected, instantiated, and then optimized in the appropriate number, shape, and pose as foreleg parts 840A-840C and hindleg parts 860A-860C; as can be seen in the middle character in FIG. 8, in particular embodiments, sketches of a single foreleg 830B and a single hindleg 850B may be instantiated as a pair of foreleg parts 840B and a pair of hindleg parts 860B. As further shown in FIG. 8, sketches 870A-870C may be similarly detected, instantiated, and then optimized in the appropriate number, shape, and pose as wings 880A-880C.

In particular embodiments, after reviewing the character's 3D instantiation, the user may either redraw any stroke and repeat the fitting of the corresponding part, or continue to add new parts to the character.

In particular embodiments, the design spaces explored by the method may either be explicitly provided by artists through parametrized rigs, or they can be implicitly defined. In particular embodiments, both the mechanical structure and the motions of a complex mechanical character may be specified using techniques as described herein. Such mechanical assemblies may be modeled using a collection of components and constraints.

In 2D, the configuration of each component i is given by its state $s_i = \alpha, x; y)^T$, where $\alpha$ describes the component's orientation, and x and y hold its world-space position. The vector s aggregates the states of all components in a mechanical assembly. Constraints C (s) are introduced to restrict the relative motion between pairs of components, and they are used to model virtual motors and different types of mechanical joints. To solve for the motion of the assembly, the system computes the state vector s that minimizes $\frac{1}{2}C(s)^T C(s)$ using Newton's method.

Figure 9:
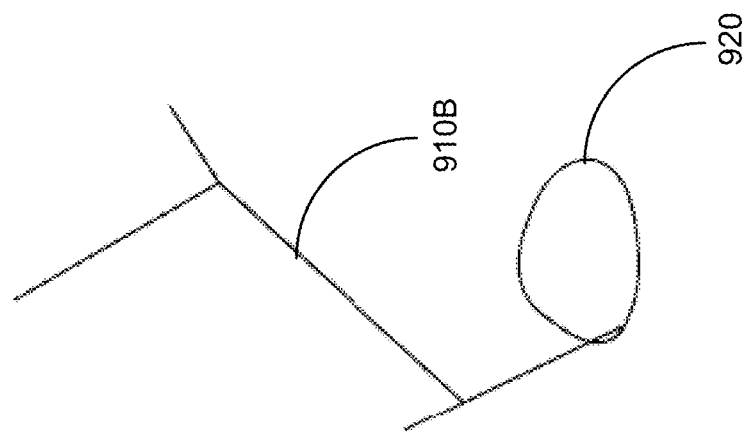
FIG. 9 illustrates an example method of creating mechanical assemblies.
Figure 9:
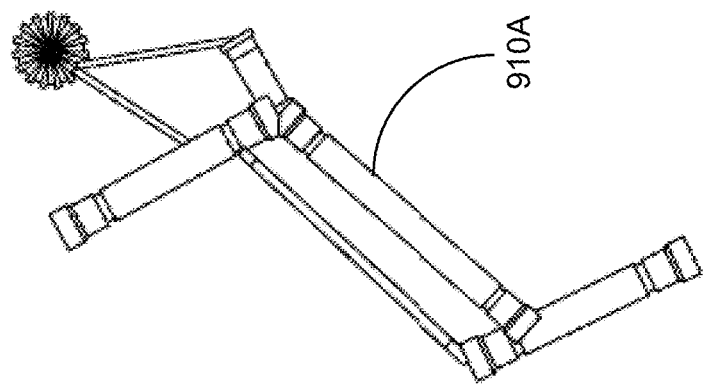

In particular embodiments, the system may receive as input a library of parametrized mechanisms that represent, for example, different types of limbs that a mechanical character might have. As illustrated in FIG. 9, skeletal curves may be rigidly attached to the main mechanical structure of the mechanisms. These skeletal curves may be used to differentiate between the different classes of mechanism that are available, and to define the energy term introduced above. FIG. 9 illustrates mechanical leg 910B and its corresponding 2D representation 910A. Additionally, mechanical leg 910B may be assigned a motion curve 920 which determines the range of motion for mechanical leg 910B. The world coordinates for any point u along a skeletal curve are computed as $z(p) = R_i u + t_i$, where $R_i$ is the orientation, and $t_i$ the translation of the component the curve is attached to. The parameters p may be optimized to allow the system to simultaneously change a mechanisms' kinematic properties (e.g., the length of any rigid segment) and motion; in particular embodiments, they may consist of the local coordinates that define the location of each joint.

Figure 10:
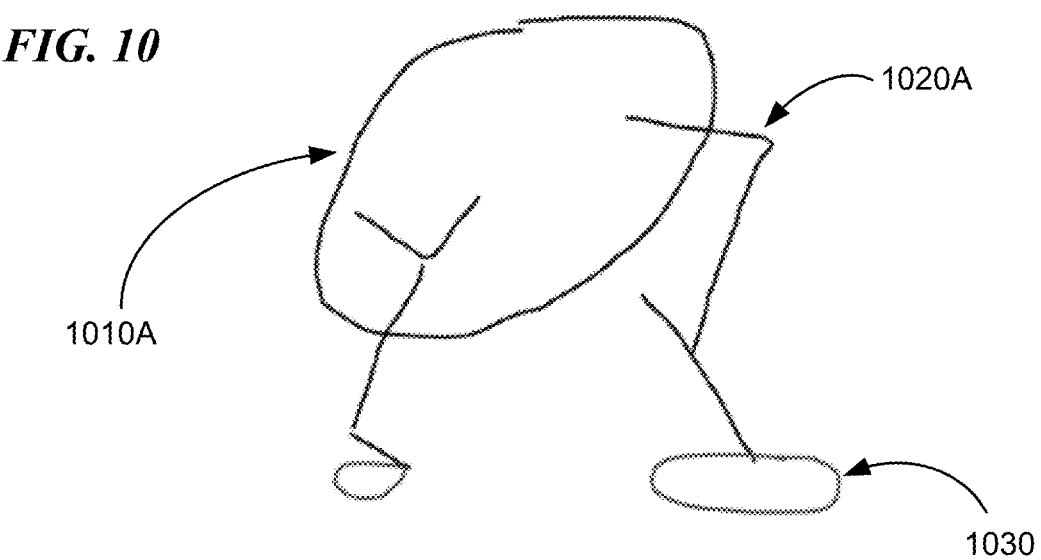
FIG. 10 illustrates an example of making fine-scale adjustments to a character rig.
Figure 10:
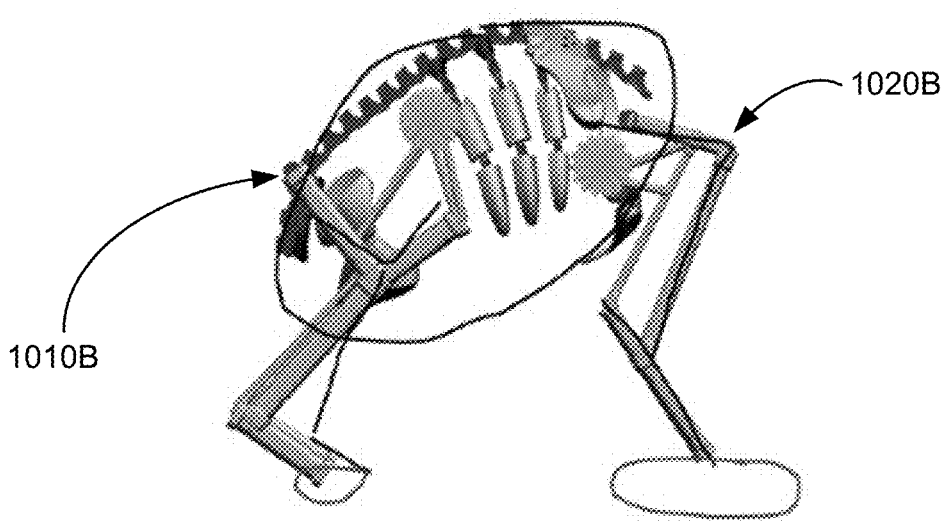
Figure 10:
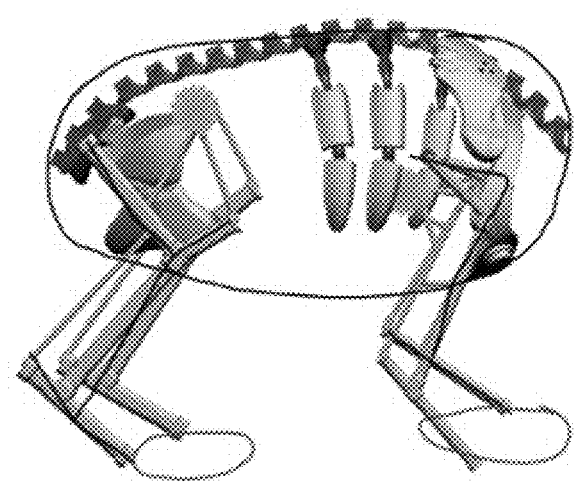

As illustrated in FIG. 10, a design system to generate two types of legs and combine them with a rigid body shape parameterized in translation, rotation and scale along the x and y axes is presented. A user may first sketch mechanical body 1010A of any size, which results in displaying its corresponding display body 1010B. Additionally, a user may then sketch mechanical leg 1020A and motion curves 1030 resulting in a complete mechanical assembly with a range of motion defined in the mechanical legs 1020B. Using these models as input, the user may create a customized mechanically simulated beast. As further illustrated by the version of the beast at the bottom of FIG. 10, using the techniques described herein, the user may adapt the shape of the legs, their motion paths, or the relative phase between them may be done quickly and intuitively.

Figure 11A:
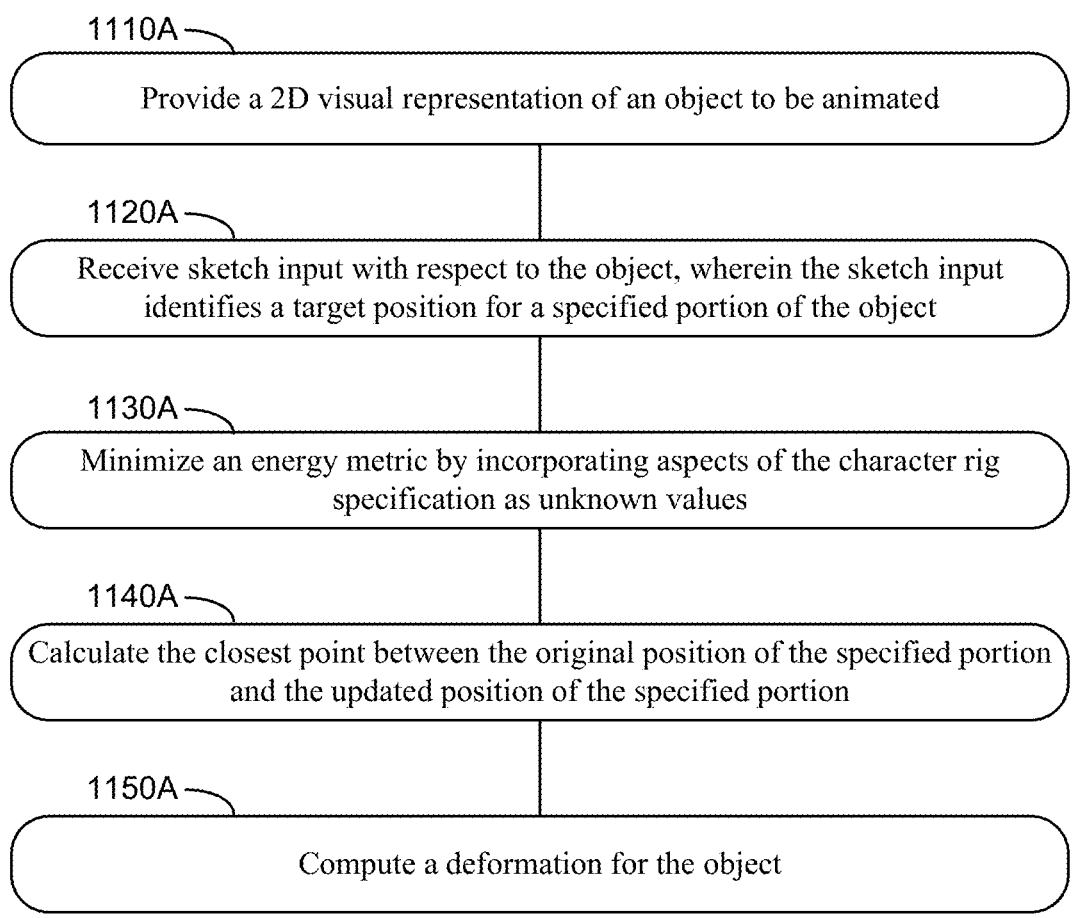
FIG. 11A illustrates a flowchart for an example method of sketch-based posing of 3D characters.

FIG. 11A illustrates a flowchart for an example method 1100A of sketch-based posing of 3D characters. The method may begin at step 1110A, where particular embodiments may provide a 2D visual representation of an object to be animated. At step 1120A, particular embodiments may receive sketch input with respect to the object, wherein the sketch input identifies a target position for a specified portion of the object. At step 1130A, particular embodiments may minimize an energy metric by incorporating aspects of the character rig specification as unknown values. At step 1140A, particular embodiments may calculate the closest point between the original position of the specified portion and the updated position of the specified portion. At step 1150A, particular embodiments may compute a deformation for the object. Particular embodiments may repeat one or more steps of the method of FIG. 11A, where appropriate. Although this disclosure describes and illustrates particular steps of the method of FIG. 11A as occurring in a particular order, this disclosure contemplates any suitable steps of the method of FIG. 11A occurring in any suitable order. Moreover, although this disclosure describes and illustrates an example method for sketch-based posing of 3D characters, including the particular steps of the method of FIG. 11A, this disclosure contemplates any suitable method for sketch-based posing of 3D characters, including any suitable steps, which may include all, some, or none of the steps of the method of FIG. 11A, where appropriate. Furthermore, although this disclosure describes and illustrates particular components, devices, or systems carrying out particular steps of the method of FIG. 11A, this disclosure contemplates any suitable combination of any suitable components, devices, or systems carrying out any suitable steps of the method of FIG. 11A.

Figure 11B:
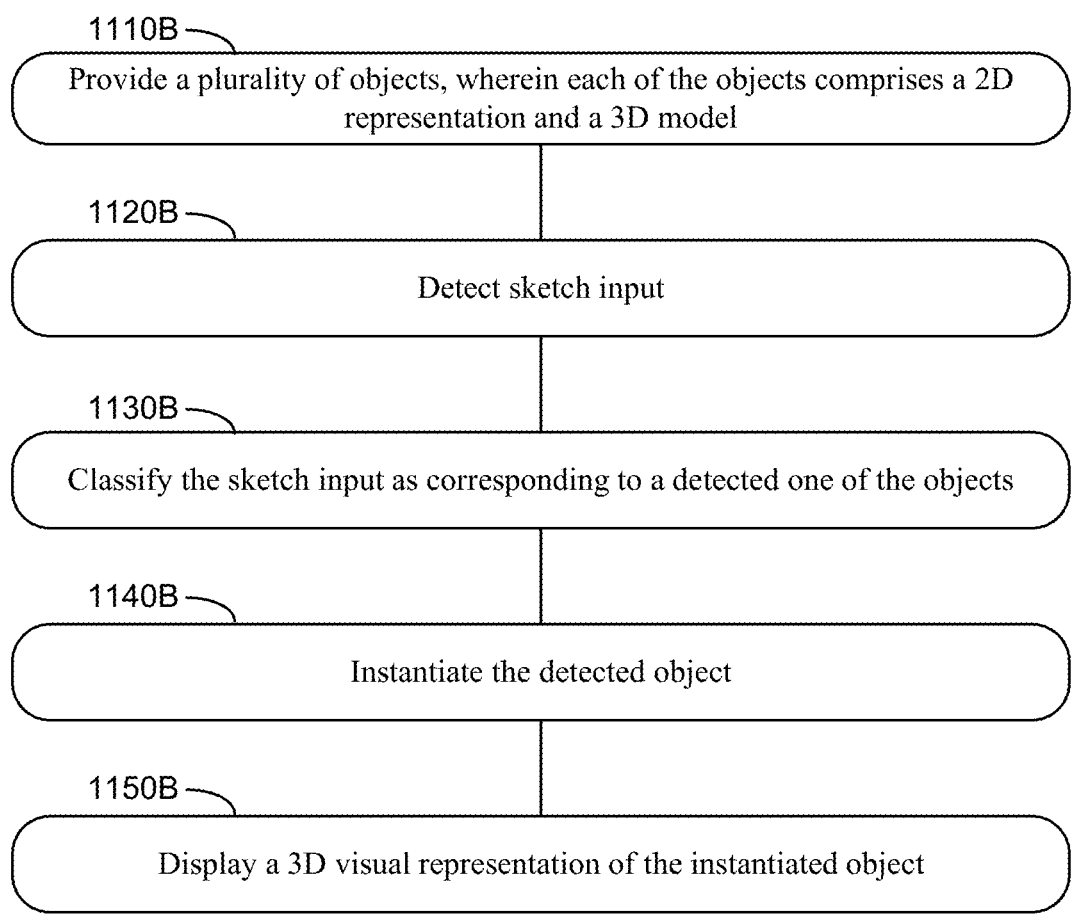
FIG. 11B illustrates a flowchart for an example method of design and customization of 3D characters.

FIG. 11B illustrates a flowchart for an example method 1100B of design and customization of 3D characters using sketch-based techniques. The method may begin at step 1110B, where particular embodiments may provide a plurality of objects, wherein each of the objects comprises a 2D representation and a 3D model. At step 1120B, particular embodiments may detect sketch input. At step 1130B, particular embodiments may classify the sketch input as corresponding to a detected one of the objects. At step 1140B, particular embodiments may instantiate the detected object. At step 1150B, particular embodiments may display a 3D visual representation of the instantiated object. Particular embodiments may repeat one or more steps of the method of FIG. 11B, where appropriate. Although this disclosure describes and illustrates particular steps of the method of FIG. 11B as occurring in a particular order, this disclosure contemplates any suitable steps of the method of FIG. 11B occurring in any suitable order. Moreover, although this disclosure describes and illustrates an example method for design and customization of 3D characters using sketch-based techniques, including the particular steps of the method of FIG. 11B, this disclosure contemplates any suitable method for design and customization of 3D characters using sketch-based techniques, including any suitable steps, which may include all, some, or none of the steps of the method of FIG. 11B, where appropriate. Furthermore, although this disclosure describes and illustrates particular components, devices, or systems carrying out particular steps of the method of FIG. 11B, this disclosure contemplates any suitable combination of any suitable components, devices, or systems carrying out any suitable steps of the method of FIG. 11B.

Figure 12:
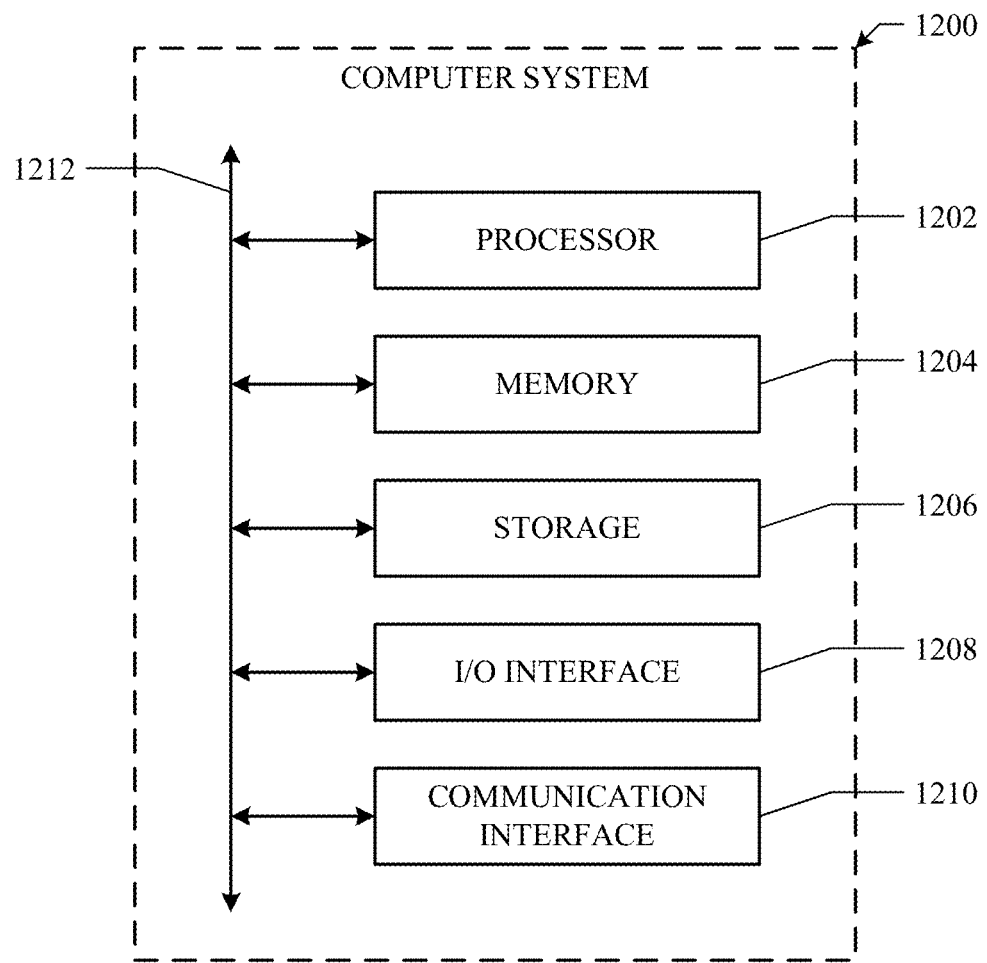
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by one or more computing devices, comprising:
providing a two-dimensional (2D) representation of an object to be animated, wherein the 2D representation of the object is created by projection of a three-dimensional (3D) model of the object into a viewing plane;

mapping rig parameters of a character rig specification for the object to a 2D representation of the 3D model and to a surface mesh for the 3D model, wherein changes to the character rig specification simultaneously influence the surface mesh and the 2D representation;

receiving sketch input with respect to the object, wherein the sketch input identifies a target position for a specified portion of the object;

updating the character rig specification based on the target position for the specified portion of the object;

computing a deformation for the object based on the updated character rig specification, wherein:
- the surface mesh and the 2D representation are deformed in accordance with the computed deformation,
- the character rig specification comprises a defined space of deformations, and
- the computed deformation is within the defined space; and displaying an updated version of the 2D representation of the object based on the computed deformation.

2. The method of claim 1, wherein the sketch input for the target position is drawn over the 2D representation of the object.

3. The method of claim 1, wherein the deformation for the object is computed based on a nonlinear iterative closest point calculation between an original position of the specified portion and an updated position of the specified portion.

4. The method of claim 3, wherein the updated position of the specified portion is determined by sampling the sketch input identifying the target position.

5. The method of claim 3, wherein the nonlinear iterative closest point calculation incorporates correspondence weights determined between a first plurality of points along the 2D representation of the object and a second plurality of points along the sketch input identifying the target position.

6. The method of claim 3, wherein the nonlinear iterative closest point calculation is based on minimizing an energy metric by incorporating aspects of the character rig specification as unknown values.

7. The method of claim 6, wherein the minimizing the energy metric incorporates a regularization energy component.

8. The method of claim 1, further comprising receiving initial sketch input comprising a curve drawn over a mesh for the object, wherein the 2D representation of the object is based on the initial sketch input, and wherein the curve is incorporated in the computed deformation.

9. The method of claim 8, wherein the computing the deformation comprises penalizing any deformation in regions remote from the curve of the initial sketch input.

10. The method of claim 1, wherein the 2D representation of the object is based on a set of curves embedded into the object, and wherein the curves are rigged alongside a mesh for the object.

11. One or more computer-readable non-transitory storage media embodying software that is operable when executed to:
provide a two-dimensional (2D) representation of an object to be animated, wherein the 2D representation of the object is created by projection of a three-dimensional (3D) model of the object into a viewing plane;
map rig parameters of a character rig specification for the object to a 2D representation of the 3D model and to a surface mesh for the 3D model, wherein changes to the character rig specification simultaneously influence the surface mesh and the 2D representation;
receive sketch input with respect to the object, wherein the sketch input identifies a target position for a specified portion of the object;
update the character rig specification based on the target position for the specified portion of the object;
compute a deformation for the object based on the updated character rig specification for the object, wherein the character rig specification comprises the 3D model of the object, and wherein:
- the surface mesh and the 2D representation are deformed in accordance with the computed deformation,
- the character rig specification comprises a defined space of deformations, and
- the computed deformation is within the defined space; and display an updated version of the 2D representation of the object based on the computed deformation.

12. The media of claim 11, wherein the sketch input for the target position is drawn over the 2D representation of the object.

13. The media of claim 11, wherein the deformation for the object is computed based on a nonlinear iterative closest point calculation between an original position of the specified portion and an updated position of the specified portion.

14. The media of claim 13, wherein the updated position of the specified portion is determined by sampling the sketch input identifying the target position.

15. The media of claim 13, wherein the nonlinear iterative closest point calculation incorporates correspondence weights determined between a first plurality of points along the 2D representation of the object and a second plurality of points along the sketch input identifying the target position.

16. The media of claim 13, wherein the nonlinear iterative closest point calculation is based on minimizing an energy metric by incorporating aspects of the character rig specification as unknown values.

17. The media of claim 16, wherein the minimizing the energy metric incorporates a regularization energy component.

18. The media of claim 11, wherein the software is further operable when executed to receive initial sketch input comprising a curve drawn over a mesh for the object, wherein the 2D representation of the object is based on the initial sketch input, and wherein the curve is incorporated in the computed deformation.

19. The media of claim 18, wherein the software that is operable when executed to compute the deformation comprises software that is operable when executed to penalize any deformation in regions remote from the curve of the initial sketch input.

20. A system comprising:
one or more processors; and
one or more computer-readable non-transitory storage media coupled to one or more of the processors and comprising instructions operable when executed by one or more of the processors to cause the system to:
provide a two-dimensional (2D) representation of an object to be animated, wherein the 2D representation of the object is created by projection of a three-dimensional (3D) model of the object into a viewing plane;
map rig parameters of a character rig specification for the object to a 2D representation of the 3D model and to a surface mesh for the 3D model, wherein changes to the character rig specification simultaneously influence the 3D model and the 2D representation of the 3D model;

receive sketch input with respect to the object, wherein the sketch input identifies a target position for a specified portion of the object;

update the character rig specification based on the target position for the specified portion of the object;

compute a deformation for the object based on the updated character rig specification for the object, wherein the character rig specification comprises the 3D model of the object, and wherein:
- the surface mesh and the 2D representation are deformed in accordance with the computed deformation,
- the character rig specification comprises a defined space of deformations, and
- the computed deformation is within the defined space; and display an updated version of the 2D representation of the object based on the computed deformation.

\* \* \* \* \*